United States Patent
Zhou et al.

(10) Patent No.: US 8,525,400 B2
(45) Date of Patent: Sep. 3, 2013

(54) LUMINESCENT ELEMENT, PREPARATION METHOD THEREOF AND LUMINESCENCE METHOD

(75) Inventors: Mingjie Zhou, Guangdong (CN); Wenbo Ma, Guangdong (CN); Yugang Liu, Guangdong (CN); Qingtao Li, Guangdong (CN)

(73) Assignee: Ocean's King Lighting Science & Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/392,482

(22) PCT Filed: Aug. 26, 2009

(86) PCT No.: PCT/CN2009/073514
§ 371 (c)(1),
(2), (4) Date: Feb. 24, 2012

(87) PCT Pub. No.: WO2011/022875
PCT Pub. Date: Mar. 3, 2011

(65) Prior Publication Data
US 2012/0153803 A1    Jun. 21, 2012

(51) Int. Cl.
*H01J 29/20* (2006.01)
*C03C 17/09* (2006.01)
*C22F 1/00* (2006.01)
*C23C 14/34* (2006.01)
*B32B 17/06* (2006.01)
*B32B 3/00* (2006.01)

(52) U.S. Cl.
USPC ............... 313/463; 428/432; 428/336

(58) Field of Classification Search
USPC .......... 313/463, 484–487, 489, 498, 512, 313/467–468, 499, 501–503; 428/432, 336; 257/79–81, 98–100; 362/235, 227, 231, 362/293, 545, 800; 345/44, 46; 438/22, 438/26, 458
See application file for complete search history.

(56) References Cited

U.S. PATENT DOCUMENTS 3,416,019 A * 12/1968 Kaduk ...................... 313/486
5,843,855 A    12/1998 Suha et al.
(Continued)

FOREIGN PATENT DOCUMENTS

CN    1664056 A    9/2005
CN    1765794 A    5/2006
(Continued)

OTHER PUBLICATIONS

International Search Report of corresponding International Application No. PCT/CN2009/073514; mailed Jun. 3, 2010; 6 pages.
(Continued)

*Primary Examiner* — Anh Mai
*Assistant Examiner* — Elmito Breval
(74) *Attorney, Agent, or Firm* — Haynes Beffel & Wolfeld LLP

(57) ABSTRACT

A luminescent element includes a luminescent glass and a metal layer with a metal microstructure formed on a surface of the luminescent glass; wherein the luminescent glass has a chemical composition: $aR_2O \cdot bZnO \cdot cSiO_2 \cdot nMnO_2$, wherein R represents the alkali metal element, a, b, c, and n are, by mole parts, 9.5~40, 8~40, 35~70, and 0.01~1, respectively. A preparation method of a luminescent element and a luminescence method are also provided. The luminescent element has good luminescence homogeneity, high luminescence efficiency, good luminescence stability and simple structure, and can be used in luminescent device with ultrahigh brightness.

10 Claims, 4 Drawing Sheets

(56) References Cited

U.S. PATENT DOCUMENTS

| | | | |
|---|---|---|---|
| 7,498,731 B2 | 3/2009 | Fechner et al. | |
| 2001/0017044 A1* | 8/2001 | Mitra et al. | 65/134.3 |

FOREIGN PATENT DOCUMENTS

| | | |
|---|---|---|
| CN | 1805105 A | 7/2006 |
| CN | 101314519 A | 12/2008 |
| EP | 0265983 A1 | 5/1988 |
| EP | 0266812 A1 | 5/1988 |

OTHER PUBLICATIONS

International Search Report of corresponding International Application No. PCT/CN2009/073516; mailed Jun. 3, 2010; 6 pages.

* cited by examiner

LUMINESCENT ELEMENT, PREPARATION METHOD THEREOF AND LUMINESCENCE METHOD

FIELD OF THE INVENTION

The present disclosure relates to luminescent materials, and more particularly relates to a luminescent element including a glass substrate made of luminescent material, preparation method thereof and luminescence method.

BACKGROUND OF THE INVENTION

The conventional materials used as luminescent substrate include phosphor, nanocrystal, glass, etc. Comparing to the crystal and phosphor, the glass is transparent, rigid, and has excellent chemical stability and superior luminescent performance. In addition, the glass can be easily machined into products with various shapes, such as display devices or luminescent light sources with various shapes and sizes.

For example, in vacuum microelectronics, field emission devices usually use luminescent glass as illuminant, which has shown a wide prospect in illumination and display techniques and draws a lot attention to domestic and foreign research institutes. The working principle of the field emission device is that, in vacuum, the anode applies a positive voltage to the field emissive arrays (FEAs) to form an accelerating electric field, electron emitted from the cathode accelerately bombards the luminescent material on the anode plate to irradiate. The field emission device has a wide operating temperature range (−40° C.~80° C.), short corresponding time (<1 ms), simple structure, low energy consumption, and meets the environmental protection requirements. Furthermore, materials such as the phosphor, luminescent glass, luminescent film, etc can be served as luminescent material in field emission device, however, they all suffer from serious problems of low luminous efficiency, thus significantly limit the application of the field emission device, especially in the application of illumination.

SUMMARY OF THE INVENTION

In one aspect of the present disclosure, a luminescent element with a high luminescent homogeneity, high luminous efficiency, good stability, simple structure and a preparation method with a simple processes and low cost are desired. In another aspect of the present disclosure, a luminescence method of the luminescent element with simple operation, good reliability, and improving luminous efficiency is also desired.

A luminescent element includes: a luminescent glass; and a metal layer with a metal microstructure formed on a surface of the luminescent glass; wherein the luminescent glass has a chemical composition: $aR_2O.bZnO.cSiO_2.nMnO_2$, wherein R represents the alkali metal element, a, b, c, and n are, by mole parts, 9.5~40, 8~40, 35~70, and 0.01~1, respectively.

A preparation method of a luminescent element includes: preparing a luminescent glass comprising a chemical composition: $aR_2O.bZnO.cSiO_2.nMnO_2$, wherein R represents the alkali metal element, a, b, c, and n are, by mole parts, 9.5~40, 8~40, 35~70, and 0.01~1, respectively; forming a metal layer on the luminescent glass, and annealing the luminescent glass and the metal layer in vacuum to form a metal microstructure of the metal layer, and then cooling the luminescent glass and the metal layer to form the luminescent element.

A luminescence method of a luminescent element includes: obtaining the luminescent element according to the preparation method described above; and emitting cathode-ray to the metal layer, forming a surface plasmon between the metal layer and the luminescent glass by the radiation of the cathode-ray and then irradiating the luminescent glass.

In the luminescent element described above, the metal layer with a metal microstructure is formed on a surface of the luminescent glass, and irradiated by the cathode-ray, a surface plasmon can be formed between the metal layer and the luminescent glass. Due to the surface plasmon effect, the internal quantum efficiency of the luminescent glass is highly increased, and the spontaneous emission of the luminescent glass is highly increased, so that the luminous efficiency of the luminescent glass is improved and the problem of low efficiency of the luminescent materials is overcomed. Accordingly, in the luminescence method of the luminescent element, once emitting cathode-ray to the metal layer, the surface plasmon will be formed between the metal layer and the luminescent glass, thus improving the luminous efficiency and reliability. The luminescent element has a simple two-layer structure for including the luminescent glass and the metal layer. In addition, there is a uniform interface formed between the luminescent glass and the metal layer, so that an excellent luminescent homogeneity and stability is achieved. In the luminescence method of the luminescent element, once emitting cathode-ray to the metal layer, the surface plasmon will be formed between the metal layer and the luminescent glass, thus improving the luminous efficiency and reliability of the luminescent glass. In the embodiment of the preparation method of the luminescent element, the luminescent element can be obtained by forming a metal layer on the luminescent glass and annealing the luminescent glass and the metal layer, thus the preparation method is simple and has a low cost. The luminescent element can be widely applied to luminescent devices with ultra-high brightness and high-speed motion, such as field emission display.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
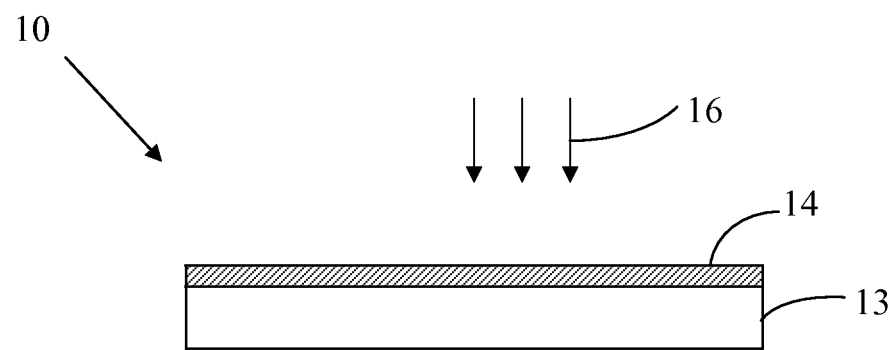
FIG. 1 is a schematic, side view of a luminescent element according to an embodiment of the present disclosure.

Referring to FIG. 1, an embodiment of a luminescent element includes a luminescent glass 13 and a metal layer 14 formed on a surface of the luminescent glass 13. The metal layer 14 has a metal microstructure, which may be called as micro-nano structure. In addition, the metal microstructure is aperiodic, i.e. composed of metal crystal in irregular arrangement.

The luminescent glass 13 is a silicate glass doped with manganese ions. The luminescent glass has a chemical composition: $aR_2O \cdot bZnO \cdot cSiO_2 \cdot nMnO_2$, wherein R represents the alkali metal element, a, b, c, and n are, by mole parts, 9.5~40, 8~40, 35~70, and 0.01~1, respectively. The alkali metal element is at least one element selected from the group consisting of Na, K, and Li.

The metal layer 14 may be made of metals with excellent chemical stability, such as antioxidant and corrosion-resistant metals, or common metals. The metal layer 14 is preferably made of at least one metal selected from the group consisting of Au, Ag, Al, Cu, Ti, Fe, Ni, Co, Cr, Pt, Pd, Mg, and Zn, or more preferably made of at least one metal selected from the group consisting of Au, Ag, and Al. The metal layer 14 may be made of one metal or a composite metal. The composite metal may be an alloy of two or more than two metals described above. For example, the metal layer 14 may be an Ag/Al alloy layer or an Au/Al alloy layer, where the weight percent of Ag or Au is preferably more than 70%. The metal layer 14 has a thickness in a range of 0.5~200 nm, preferably 1~100 nm.

As a luminescent element, the luminescent element 10 can be widely applied to luminescent devices with ultra-high brightness and high-speed motion, such as field emission display, field emission light source, and large advertising display, etc. Take field emission display as an example, the anode applies a positive voltage to the field emission cathode to form an accelerating electric field, the cathode emits electron, i.e. cathode-ray 16 to the metal layer 14, so that a surface plasmon is formed between the metal layer 14 and the luminescent glass 13. Due to the surface plasmon effect, the internal quantum efficiency of the luminescent glass 13 is highly increased, and the spontaneous emission of the luminescent glass is highly increased, so that the luminous efficiency of the luminescent glass is improved and the problem of low efficiency of the luminescent materials is overcomed. In addition, since a metal layer is formed on the surface of the luminescent glass 13, a uniform interface is formed between the whole metal layer and the luminescent glass 13, thus improving the luminescent homogeneity.

Figure 2:
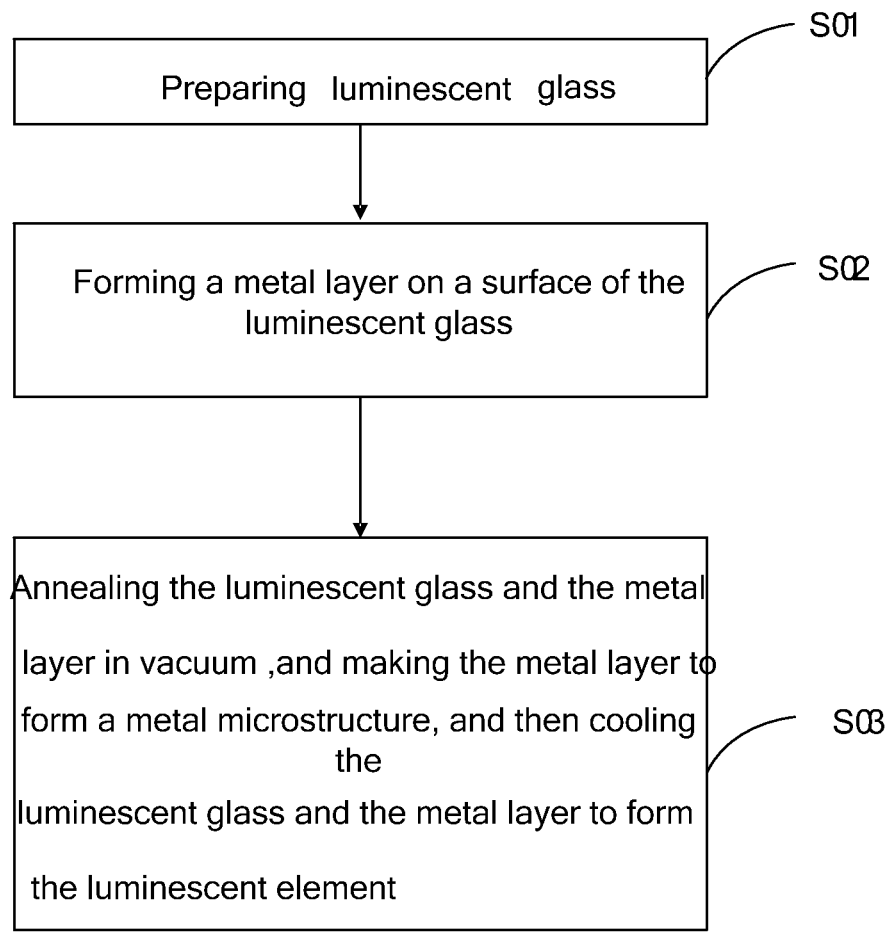
FIG. 2 is a flowchart of an embodiment of a preparation method of a luminescent element.

Referring to FIG. 1 and FIG. 2, a flow chart of an embodiment of a preparation method of a luminescent element includes following steps:

Step S01, the luminescent glass 13 is prepared with a chemical composition: $aR_2O \cdot bZnO \cdot cSiO_2 \cdot nMnO_2$, wherein R represents the alkali metal element, a, b, c, and n are, by mole parts, 9.5~40, 8~40, 35~70 and 0.01~1, respectively.

Step S02, the metal layer 14 is formed on a surface of the luminescent glass 13.

Step S03, the luminescent glass 13 and the metal layer 14 are annealed in vacuum to form the metal microstructure of the metal layer 14, and then the luminescent glass 13 and the metal layer 14 are cooled to form the luminescent element 10.

In step S01, the preparation of the luminescent glass includes: weighing metal oxides of the composition according to the mole parts in the chemical composition of the luminescent glass; melting the metal oxides at a temperature in a range of 1200~1600° C.; cooling the metal oxides to ambient temperature, annealing in reducing atmosphere at the temperature in a range of 400~750° C. for 3~12 hours; and obtaining the luminescent glass. In detail, raw materials, such as alkali metal salt, $SiO_2$, ZnO, and $MnO_2$ in analytical grade are weighed according to the mole parts in the chemical composition $aR_2O \cdot bZnO \cdot cSiO_2 \cdot nMnO_2$ of the luminescent glass. The raw materials are melt at a temperature in a range of 1200~1600° C. for 1~5 hours and cooled to ambient temperature. The raw materials are placed in reducing atmosphere at the temperature in a range of 400~750° C. to be annealed for 3~12 hours to obtain the luminescent glass. Furthermore, the luminescent glass can be cut, and polished to a certain size to meet the application demands.

As previously described, the metal layer 14 is formed by depositing metal source with excellent chemical stability, such as antioxidant and corrosion-resistant metals, or common metals. The metal layer 14 is preferably made of at least one metal selected from the group consisting of Au, Ag, Al, Cu, Ti, Fe, Ni, Co, Cr, Pt, Pd, Mg, and Zn, or more preferably made of at least one metal selected from the group consisting of Au, Ag, and Al. In step S02, the metal layer 14 is formed on the surface of the luminescent glass 13 via PVD or CVD, for example, via sputtering or evaporation, with at least one metal described above. The metal layer 14 has a thickness in a range of 0.5~200 nm, preferably 1~100 nm.

In step S03, after the formation of the metal layer 14 on the luminescent glass 13, the metal layer 14 and the luminescent glass 13 are annealed at a temperature in a range of 50~650° C. for a period of time of 5 minutes to 5 hours and cooled to ambient temperature. The preferred anneal temperature is in a range of 100~600° C., and the preferred anneal time is in a range of 15 minutes to 3 hours.

Figure 3:
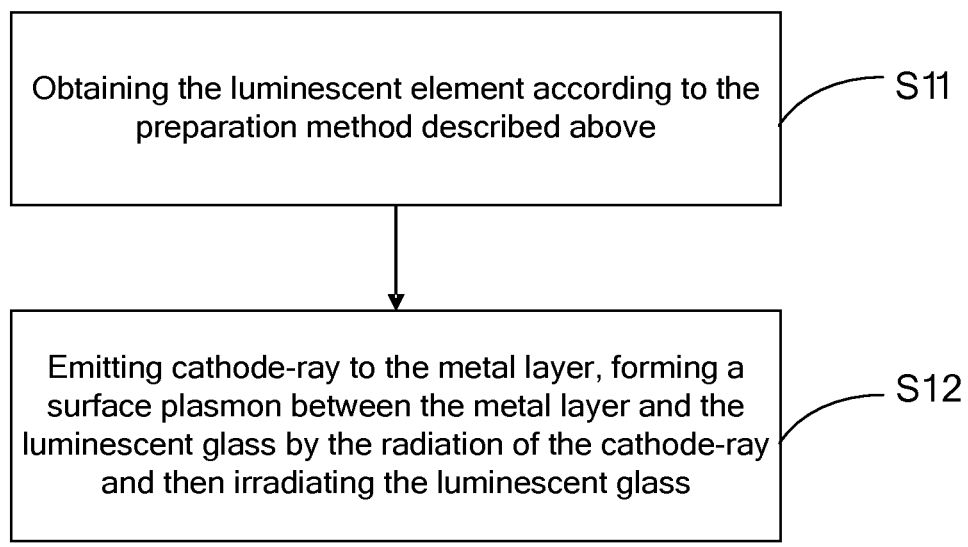
FIG. 3 is a flowchart of an embodiment of a luminescence method of a luminescent element.

Referring to FIG. 1 and FIG. 3, a flow chart of a luminescence method of the luminescent element includes following steps:

Step S11, the luminescent element 10 is obtained according to the previously described preparation method.

Step S12, cathode-ray 16 is emitted to the metal layer 14. A surface plasmon is formed between the metal layer 14 and the luminescent glass 13 by the radiation of the cathode-ray 16 and thus irradiating the luminescent glass 13.

The luminescent element 10 has features of structure and composition as previously described. In application, the step S12 can be implemented by field emission display or illumination light source. In vacuum, the anode applies a positive voltage to the field emission cathode to form an accelerating electric field, so that the cathode emits cathode-ray 16. Excited by the cathode-ray 16, electron beam will penetrate the metal layer 14 and irradiate the luminescent glass 13. During such process, a surface plasmon is formed between the metal layer 14 and the luminescent glass 13. Due to the surface plasmon effect, the internal quantum efficiency of the luminescent glass 13 is highly increased, and the spontaneous emission of the luminescent glass is highly increased, so that the luminous efficiency of the luminescent glass is improved.

Surface plasmon (SP) is a wave spreading along the interface between the metal and medium, whose amplitude exponentially decay with the increase of the distance away from the interface. When changing a surface structure of the metal, the feature, dispersion relationship, excitation mode, coupling effect of the surface plasmon polaritons (SPPs) will be significantly changed. The electromagnetic field caused by the SPPs can not only constrain the spread of the light wave in sub-wavelength size structure, but also can produce and manipulate the electromagnetic radiation from light frequency to microwave band, thus active manipulation of the light spread is implemented. Accordingly, the present embodiment uses the excitation of the SPPs to increase the optical density of the luminescent glass and to enhance spontaneous emission velocity of the luminescent glass. In addition, the coupling effect of the surface plasmon can be used, when the luminescent glass irradiates, sympathetic vibration phenomena occurs, thus the internal quantum efficiency of the luminescent glass is highly increased, so that the luminous efficiency of the luminescent glass is improved.

A plurality of examples are described to illustrate the different compositions and preparation methods of the luminescent element, and their performances.

Example 1

A 1×1 cm2, polished, green luminescent glass prepared accordingly with the composition of $9.5Li_2O.35ZnO.55SiO_2.0.35MnO_2$ is selected. A silver layer with a thickness of 2 nm is deposited on the surface of the luminescent glass via a magnetron sputtering equipment. The luminescent glass and the silver layer are annealed at a temperature of 300° C. for half an hour in vacuum with the vacuum degree $<1\times10^{-3}$ Pa and cooled to ambient temperature, thus a luminescent element is obtained.

Figure 4:
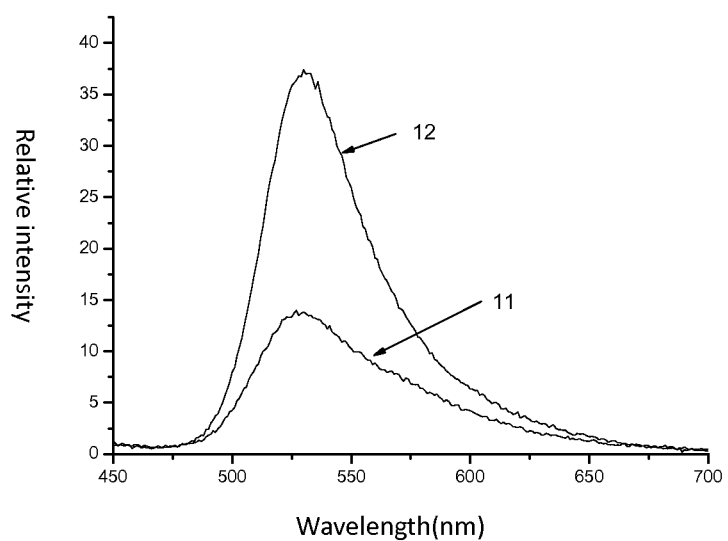
FIG. 4 is an emission spectrum of the luminescent element of Example 1 comparing with the luminescent glass without the metal layer, the emission spectrum being tested by Shimadzu RF-5301PC spectrometer excited by cathode-ray of 5 KV accelerating voltage.

The prepared luminescent element is bombarded by cathode-ray from an electron gun, and the electron beam penetrates the metal layer and irradiates the luminescent glass, thus an emission spectrum shown in FIG. 4 is obtained. In FIG. 4, curve 11 represents an emission spectrum of a luminescent glass without the metal layer; curve 12 represents an emission spectrum of the luminescent element with the metal layer of Example 1. As shown in FIG. 4, since a surface plasmon is formed between the metal layer and the luminescent glass, comparing to the luminescent glass without the metal layer, the luminescent element with the metal layer of Example 1 has a luminescence integral intensity 2.1 times as that of the luminescent glass without the metal layer in a wavelength of 300~700 nm, accordingly, the luminescent performance is greatly improved.

Other Examples have the similar emission spectrums and luminescent performance as Example 1, which will not be described later.

Example 2

A 181 cm2, polished, green luminescent glass prepared accordingly with the composition of $20Li_2O.24ZnO.56SiO_2.0.24MnO_2$ is selected. A gold layer with a thickness of 0.5 nm is deposited on the surface of the luminescent glass via a magnetron sputtering equipment. The luminescent glass and the gold layer are annealed at a temperature of 200° C. for 5 hours in vacuum with the vacuum degree $<1\times10^{-3}$ Pa and cooled to ambient temperature, thus a luminescent element is obtained.

Example 3

A 181 cm2, polished, green luminescent glass prepared accordingly with the composition of $10Na_2O.40ZnO.50SiO_2.0.01MnO_2$ is selected. An aluminum layer with a thickness of 200 nm is deposited on the surface of the luminescent glass via a magnetron sputtering equipment. The luminescent glass and the aluminum layer are annealed at a temperature of 500° C. for 5 hours in vacuum with the vacuum degree $<1\times10^{-3}$ Pa and cooled to ambient temperature, thus a luminescent element is obtained.

Example 4

A 181 cm2, polished, green luminescent glass prepared accordingly with the composition of $12K_2O.30ZnO.58SiO_2.0.5MnO_2$ is selected. A magnesium layer with a thickness of 100 nm is deposited on the surface of the luminescent glass via an electron beam evaporation equipment. The luminescent glass and the magnesium layer are annealed at a temperature of 650° C. for 5 minutes in vacuum with the vacuum degree $<1\times10^{-3}$ Pa and cooled to ambient temperature, thus a luminescent element is obtained.

Example 5

A 181 cm2, polished, green luminescent glass prepared accordingly with the composition of $22Li_2O.8ZnO.70SiO_2.0.05MnO_2$ is selected. A palladium layer with a thickness of 1 nm is deposited on the surface of the luminescent glass via an electron beam evaporation equipment. The luminescent glass and the palladium layer are annealed at a temperature of 100° C. for 3 hours in vacuum with the vacuum degree $<1\times10^{-3}$ Pa and cooled to ambient temperature, thus a luminescent element is obtained.

Example 6

A 181 cm2, polished, green luminescent glass prepared accordingly with the composition of $40Li_2O.17ZnO.42SiO_2O.1MnO_2$ is selected. A platinum layer with a thickness of 5 nm is deposited on the surface of the luminescent glass via an electron beam evaporation equipment. The luminescent glass and the platinum layer are annealed at a temperature of 450° C. for 15 minutes in vacuum with the vacuum degree $<1\times10^{-3}$ Pa and cooled to ambient temperature, thus a luminescent element is obtained.

Example 7

A 181 cm2, polished, green luminescent glass prepared accordingly with the composition of $26K_2O.24ZnO.50SiO_2.0.33MnO_2$ is selected. An iron layer with a thickness of 20 nm is deposited on the surface of the luminescent glass via an electron beam evaporation equipment. The luminescent glass and the iron layer are annealed at a temperature of 50° C. for 5 hours in vacuum with the vacuum degree $<1\times10^{-3}$ Pa and cooled to ambient temperature, thus a luminescent element is obtained.

Example 8

A 181 cm2, polished, green luminescent glass prepared accordingly with the composition of $30Li_2O.35ZnO.35SiO_2.0.4MnO_2$ is selected. A titanium layer with a thickness of 10 nm is deposited on the surface of the luminescent glass via an electron beam evaporation equipment. The luminescent glass and the titanium layer are annealed at a temperature of 150° C. for 2 hours in vacuum with the vacuum degree $<1\times10^{-3}$ Pa and cooled to ambient temperature, thus a luminescent element is obtained.

Example 9

A 181 cm2, polished, green luminescent glass prepared accordingly with the composition of $10Li_2O.30ZnO.60SiO_2.0.3MnO_2$ is selected. A copper layer with a thickness of 50 nm is deposited on the surface of the luminescent glass via an electron beam evaporation equipment. The luminescent glass and the copper layer are annealed at a temperature of 200° C. for 2.5 hours in vacuum with the vacuum degree $<1\times10^{-3}$ Pa and cooled to ambient temperature, thus a luminescent element is obtained.

Example 10

A 1×1 cm2, polished, green luminescent glass prepared accordingly with the composition of $9.5Li_2O.35ZnO.55SiO_2.0.35MnO_2$ is selected. A zinc layer with a thickness of 150 nm is deposited on the surface of the luminescent glass via an electron beam evaporation equipment. The luminescent glass and the zinc layer are annealed at a temperature of 350° C. for 0.5 hour in vacuum with the vacuum degree $<1\times10^{-3}$ Pa and cooled to ambient temperature, thus a luminescent element is obtained.

Example 11

A 1×1 cm2, polished, green luminescent glass prepared accordingly with the composition of $9.5Li_2O.35ZnO.55SiO_2.0.35MnO_2$ is selected. A chromium layer with a thickness of 120 nm is deposited on the surface of the luminescent glass via an electron beam evaporation equipment. The luminescent glass and the chromium layer are annealed at a temperature of 250° C. for 2 hours in vacuum with the vacuum degree $<1\times10^{-3}$ Pa and cooled to ambient temperature, thus a luminescent element is obtained.

Example 12

A 1×1 cm2, polished, green luminescent glass prepared accordingly with the composition of $9.5Li_2O.35ZnO.55SiO_2.0.35MnO_2$ is selected. A nickel layer with a thickness of 40 nm is deposited on the surface of the luminescent glass via an electron beam evaporation equipment. The luminescent glass and the nickel layer are annealed at a temperature of 80° C. for 4 hours in vacuum with the vacuum degree $<1\times10^{-3}$ Pa and cooled to ambient temperature, thus a luminescent element is obtained.

Example 13

A 1×1 cm2, polished, green luminescent glass prepared accordingly with the composition of $9.5Li_2O.35ZnO.55SiO_2.0.35MnO_2$ is selected. A cobalt layer with a thickness of 180 nm is deposited on the surface of the luminescent glass via an electron beam evaporation equipment. The luminescent glass and the cobalt layer are annealed at a temperature of 400° C. for 1 hour in vacuum with the vacuum degree $<1\times10^{-3}$ Pa and cooled to ambient temperature, thus a luminescent element is obtained.

Example 14

A 1×1 cm2, polished, green luminescent glass prepared accordingly with the composition of $15Li_2O.10ZnO.65SiO_2.0.2MnO_2$ is selected. A gold/aluminum layer with a thickness of 0.5 nm is deposited on the surface of the luminescent glass via an electron beam evaporation equipment. In the gold/aluminum layer, the gold is about 80 weight %, and the aluminum is about 20 weight %. The luminescent glass and the gold/aluminum layer are annealed at a temperature of 200° C. for 1 hour in vacuum with the vacuum degree $<1\times10^{-3}$ Pa and cooled to ambient temperature, thus a luminescent element is obtained.

Example 15

A 1×1 cm2, polished, green luminescent glass prepared accordingly with the composition of $25Li_2O.18ZnO.55SiO_2.0.6MnO_2$ is selected. A silver/aluminum layer with a thickness of 15 nm is deposited on the surface of the luminescent glass via a magnetron sputtering equipment. In the silver/aluminum layer, the silver is about 90 weight %, and the aluminum is about 10 weight %. The luminescent glass and the silver/aluminum layer are annealed at a temperature of 200° C. for 1 hour in vacuum with the vacuum degree $<1\times10^{-3}$ Pa and cooled to ambient temperature, thus a luminescent element is obtained.

Example 16

A 1×1 cm2, polished, green luminescent glass prepared accordingly with the composition of $35Li_2O.15ZnO.45SiO_2.0.8MnO_2$ is selected. A silver/aluminum layer with a thickness of 10 nm is deposited on the surface of the luminescent glass via an electron beam evaporation equipment. In the silver/aluminum layer, the silver is about 80 weight %, and the aluminum is about 20 weight %. The luminescent glass and the silver/aluminum layer are annealed at a temperature of 150° C. for 2 hours in vacuum with the vacuum degree $<1\times10^{-3}$ Pa and cooled to ambient temperature, thus a luminescent element is obtained.

Example 17

A 1×1 cm2, polished, green luminescent glass prepared accordingly with the composition of $12Li_2O.20ZnO.52SiO_2.0.7MnO_2$ is selected. A gold/aluminum layer with a thickness of 0.5 nm is deposited on the surface of the luminescent glass via a magnetron sputtering equipment. In the gold/aluminum layer, the gold is about 90 weight %, and the aluminum is about 10 weight %. The luminescent glass and the gold/aluminum layer are annealed at a temperature of 120° C. for 2 hours in vacuum with the vacuum degree $<1\times10^{-3}$ Pa and cooled to ambient temperature, thus a luminescent element is obtained.

In Examples described above, the metal layer 14 with a metal microstructure is formed on a surface of the luminescent glass 13, and irradiated by the cathode-ray, a surface plasmon can be formed between the metal layer 14 and the luminescent glass 13. Due to the surface plasmon effect, the internal quantum efficiency of the luminescent glass 13 is highly increased, and the spontaneous emission of the luminescent glass is highly increased, so that the luminous efficiency of the luminescent glass is improved and the problem of low efficiency of the luminescent materials is overcomed. In the luminescence method of the luminescent element, once emitting cathode-ray to the metal layer 14, the surface plasmon will be formed between the metal layer 14 and the luminescent glass 13, thus improving the luminous efficiency and reliability. The luminescent element 10 has a simple two-layer structure for including the luminescent glass 13 and the metal layer 14. In addition, there is a uniform interface formed between the luminescent glass 13 and the metal layer 14, so that an excellent luminescent homogeneity and stability is achieved. In the luminescence method of the luminescent element, once emitting cathode-ray to the metal layer 14, the surface plasmon will be formed between the metal layer 14 and the luminescent glass 13, thus improving the luminous efficiency and reliability of the luminescent glass 13.

In the embodiment of the preparation method of the luminescent element, the luminescent element can be obtained by forming a metal layer on the luminescent glass and annealing the luminescent glass and the metal layer, thus the preparation method is simple and has a low cost. The luminescent element can be widely applied to luminescent devices with ultra-high brightness and high-speed motion, such as field emission display.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A luminescent element, comprising:
   a luminescent glass; and
   a metal layer with a metal microstructure formed on a surface of the luminescent glass;
   wherein the luminescent glass has a chemical composition: $aR_2O \cdot bZnO \cdot cSiO_2 \cdot nMnO_2$, wherein R represents the alkali metal element, a, b, c, and n are, by mole parts, 9.5~40, 8~40, 35~70, and 0.01~1, respectively.

2. The luminescent element according to claim 1, wherein the metal layer is made of at least one metal selected from the group consisting of Au, Ag, Al, Cu, Ti, Fe, Ni, Co, Cr, Pt, Pd, Mg, and Zn.

3. The luminescent element according to claim 1, wherein the microstructure of the metal layer is an aperiodic microstructure.

4. The luminescent element according to claim 1, wherein the alkali metal element is at least one element selected from the group consisting of Na, K, and Li.

5. The luminescent element according to claim 1, wherein the metal layer has a thickness in a range of 0.5~200 nm.

6. A preparation method of a luminescent element, comprising:
   preparing a luminescent glass comprising a chemical composition:
   $aR_2O \cdot bZnO \cdot cSiO_2 \cdot nMnO_2$, wherein R represents the alkali metal element, a, b, c, and n are, by mole parts, 9.5~40, 8~40, 35~70, and 0.01~1, respectively;
   forming a metal layer on a surface of the luminescent glass, and annealing the luminescent glass and the metal layer in vacuum to form a metal microstructure of the metal layer, and then cooling the luminescent glass and the metal layer to form the luminescent element.

7. The preparation method according to claim 6, wherein the metal layer is formed on the luminescent glass by sputtering or evaporation.

8. The preparation method according to claim 6, wherein the preparation of the luminescent glass comprises: weighing metal oxides of the composition according to the mole parts in the chemical composition of the luminescent glass; melting the metal oxides at a temperature in a range of 1200~1600° C.; cooling the metal oxides to ambient temperature, annealing in reducing atmosphere at the temperature in a range of 400~750° C. for a period of time of 3~12 hours; and obtaining the luminescent glass.

9. The preparation method according to claim 7, wherein the anneal is proceed at a temperature in a range of 50~650° C. for 5 minutes to 5 hours.

10. A luminescence method of a luminescent element, comprising:
    obtaining the luminescent element according to the preparation method of any of claims 6 to 9; and
    emitting cathode-ray to the metal layer, forming a surface plasmon between the metal layer and the luminescent glass by the radiation of the cathode-ray and then irradiating the luminescent glass.

* * * * *